United States Patent [19]

Futscher

[11] Patent Number: 5,182,643
[45] Date of Patent: Jan. 26, 1993

[54] FLICKER REDUCTION CIRCUIT FOR INTERLACED VIDEO IMAGES

[76] Inventor: Paul T. Futscher, 8 Manson Ave., Kittery, Me. 03904

[21] Appl. No.: 649,476

[22] Filed: Feb. 1, 1991

[51] Int. Cl.[5] .............................................. H04N 7/01
[52] U.S. Cl. ..................... 358/140; 358/11; 358/166
[58] Field of Search ............... 358/11, 12, 140, 141, 358/36, 37, 166, 167, 160

[56] References Cited

U.S. PATENT DOCUMENTS

| | | | |
|---|---|---|---|
| 3,832,487 | 8/1974 | de Neit | 358/140 |
| 4,298,888 | 11/1981 | Colles et al. | 358/140 |
| 4,386,367 | 5/1983 | Peterson et al. | 358/140 |
| 4,412,251 | 10/1983 | Tanaka et al. | 358/160 |
| 4,539,592 | 9/1985 | Tanaka et al. | 358/140 |
| 4,636,857 | 1/1987 | Achiha et al. | 358/140 |
| 4,701,793 | 10/1987 | den Hollander et al. | 358/140 |
| 4,723,163 | 2/1988 | Skinner | 358/140 |
| 4,799,105 | 1/1989 | Mitchell et al. | 358/160 |

FOREIGN PATENT DOCUMENTS 1-165280 6/1989 Japan .

Primary Examiner—James J. Groody
Assistant Examiner—Glenton B. Burgess
Attorney, Agent, or Firm—Townsend and Townsend

[57] ABSTRACT

Adjacent lines of non-interlaced horizontal input video signal are buffered and combined using time division multiplexing on a pixel by pixel basis to produce an interlaced digital output signal. This time division multiplexed output signal is suitable for mapping through a color look-up table and subsequent digital to analog conversion to an interlaced analog output video signal. The image produced when this analog output signal is displayed on a video output device will have reduced apparent flicker.

33 Claims, 7 Drawing Sheets

FIG. 6

|←— CLK/2 PERIOD —→|

6A DAC A OUTPUT

| PIXEL N-1 LINE M | PIXEL N LINE M | PIXEL N+1 LINE M |

6B DAC B FRAME 1 OUTPUT

| PIXEL N-1 LINE M-1 | PIXEL N-1 LINE M+1 | PIXEL N LINE M+1 | PIXEL N LINE M-1 | PIXEL N+1 LINE M-1 | PIXEL N+1 LINE M+1 |

6C DAC B FRAME 2 OUTPUT

| PIXEL N-1 LINE M+1 | PIXEL N-1 LINE M-1 | PIXEL N LINE M-1 | PIXEL N LINE M+1 | PIXEL N+1 LINE M+1 | PIXEL N+1 LINE M-1 |

FIG. 7

|←——— CLK/2 PERIOD ———→|

7A DAC OUTPUT, FLICKER REDUCTION

| PIXEL N LINE M-1 | PIXEL N LINE M | PIXEL N LINE M+1 |

7B DAC OUTPUT, NO FLICKER REDUCTION

| PIXEL N LINE M |

FLICKER REDUCTION CIRCUIT FOR INTERLACED VIDEO IMAGES

Background—Field of Invention

The present invention relates to processing of video images for display. Specifically, this invention is both a method and an apparatus for reducing perceived flicker in interlaced video images such as those generated by computer graphic applications and the like.

Background—Description of the Prior Art

Perceived flicker is a recognized problem in displayed video images resulting from interlaced video signals. An image frame in a displayed video image created from interlaced signals is divided into two fields, where one field is made up of odd numbered lines of the video signal and the other field is made up of even lines of the video signal. Each line is made up of a given number of individual dots of color, called pixels. Generally, the fields are transmitted at a frequency of 50 Hz or 60 Hz, so that full frames are transmitted at an approximate frequency of 25 Hz or 30 Hz. Since the human eye has a response at least 70 Hz, a spurious effect called flicker results. Flicker of this type is particularly noticeable in images which contain narrow, especially single pixel width, lines, such as computer generated "wireframe" drawings, character sets and cross-hatch shaded images.

Solutions to this flicker problem generally involve trading reduced vertical resolution for reduced flicker. These solutions fall into three broad categories: averaging schemes, both digital and analog, field rate doubling schemes, and line interpolation schemes, as discussed below.

Averaging schemes generally presume that the image is available in single component (black and white), RGB (red-green-blue) or other component encoded format. For each horizontal pixel in a given odd or even line, a weighted average for each component (for example, red, green and blue) is computed and displayed using pixels from adjacent lines. That is for example, each pixel in the odd field is weighted by the adjacent pixels, above and below, in the even field. Similarly each pixel in the even field is weighted by the adjacent pixels in the odd field. A patent related to this method is U.S. Pat. No. 4,412,251 to Tanaka et al. (1983) Another patent relating to a digital implementation of this method is U.S. Pat. No. 4,799,105 to Mitchell et al. (1989).

Analog implementations of an averaging scheme for an interlaced output device have the drawback of computing the average of adjacent lines of a given field, odd or even, and therefore exhibit more degradation of resolution and inferior flicker reduction than a digital implementation of an averaging scheme, with an associated field buffer.

Digital implementations of an averaging scheme, however, have the drawback of requiring either a slow software calculation with a large memory buffer to hold the result, or a high part count to implement a field buffer and the averaging function with hardware components. Moreover, digital averaging is not well suited to modern implementations of false color computer graphics, which has become the standard computer graphics encoding format. In false color graphics the digital RGB encoding is mapped through a color lookup table (LUT) before output to a display device, hence digital averaging would have to be applied after this mapping. However, the LUT function is now often combined with the digital to analog converter (DAC) used to drive the output signal in a single integrated component, so that the mapped digital image is not accessible.

Another group of attempted solutions to the flicker problem can be generally described as field rate doubling schemes. In these schemes the digital output signal is buffered and displayed at a rate that is a multiple of (usually twice) the field rate. The flicker reduction thereby achieved is due to the field refresh rate being higher than the eye's response rate. A patent related to this method is U.S. Pat. No. 4,701,793 to den Hollander et al. (1987). This method of course requires a specialized monitor that can run substantially more rapidly (e.g. two times) than the normal field rate. This method also has the further drawbacks of requiring a high part count to implement the necessary buffering and requiring any LUTs used to be capable of running at the higher rate.

Yet another group of attempted solutions to the flicker problem are the line interpolation schemes. These schemes generally output an interpolated line of video between two adjacent lines in a given field. Various algorithms are used to compute the interpolated line, the most basic of which is to average the two adjacent lines in that field. One of many patents related to this technique is U.S Pat. No. 4,539,592 to Tanaka et al. (1985). These schemes also require a specialized monitor that can run substantially more rapidly (e.g. two times) than the normal field rate. This method also has the further drawback of requiring a high part count to implement, at minimum, a digital adder. More complex schemes of course require even more hardware. Furthermore, this method is subject to the same drawbacks relating to false color graphics as discussed above with respect to digital averaging schemes.

OBJECTS AND SUMMARY OF THE INVENTION

Accordingly, an object of the present invention is to provide a flicker reducing circuit for use with an interlaced video output device, which device typically operates at 60 Hz or 50 Hz. Further objects of the present invention are:

(a) to reduce apparent flicker in video images displayed on an interlaced video output device, when the flicker is due to narrow horizontal lines common to computer generated graphic images;

(b) to reduce such flicker on a standard interlaced output device, without requiring high vertical refresh rates on the device;

(c) to provide above described flicker reduction with a minimum use of hardware components;

(d) to reduce such flicker in systems using color LUTs;

(e) to reduce such flicker in systems with a high level of integration such that LUTs and DACs are combined in an integrated circuit;

(f) to provide a means and method for selecting and modifying the amount of flicker reduction, allowing the user to determine the desired trade-off between flicker reduction and vertical resolution for a given application.

Accordingly, the present invention provides a flicker reducing circuit and method which combine a line of input video signal with one or more prior and following lines of input video signal using time division multiplexing of the signals to produce an interlaced analog video output signal. This invention generally includes means for receiving the input video signals and delivering a time division multiplexed signal consisting of prior line or lines of input video signal within one time division or set of time divisions, the current line of input video signal within another time division or set of time divisions, and the following line or lines of input video signal within yet another time division or set of time divisions. The time division multiplexing occurs on a pixel by pixel basis where the sum duration of all consecutive units of the time divisions for each pixel is equal to a pixel duration within a line of the interlaced output video signal. The invention further includes digital to analog signal conversion means for mapping the time division multiplexed signal to a corresponding analog output video signal suitable for driving an interlaced video output device, such as a video monitor. The image thereby displayed will exhibit reduced apparent flicker.

The above, and further objects, features and advantages of the present invention, as well as its nature, utility and principal, will become more apparent from the following detailed description when read in conjunction with the accompanying drawings and claims.

BRIEF DESCRIPTION OF THE DRAWINGS

FIG. 6 (A through C) is a timing diagram used to explain the operation of the flicker reducing circuits shown in FIGS. 1 and 3.

FIG. 7 (A through B) is a timing diagram used to explain the operation of the flicker reducing circuits shown in FIGS. 2 and 4.

DESCRIPTION OF THE PREFERRED EMBODIMENTS

Figure 1:
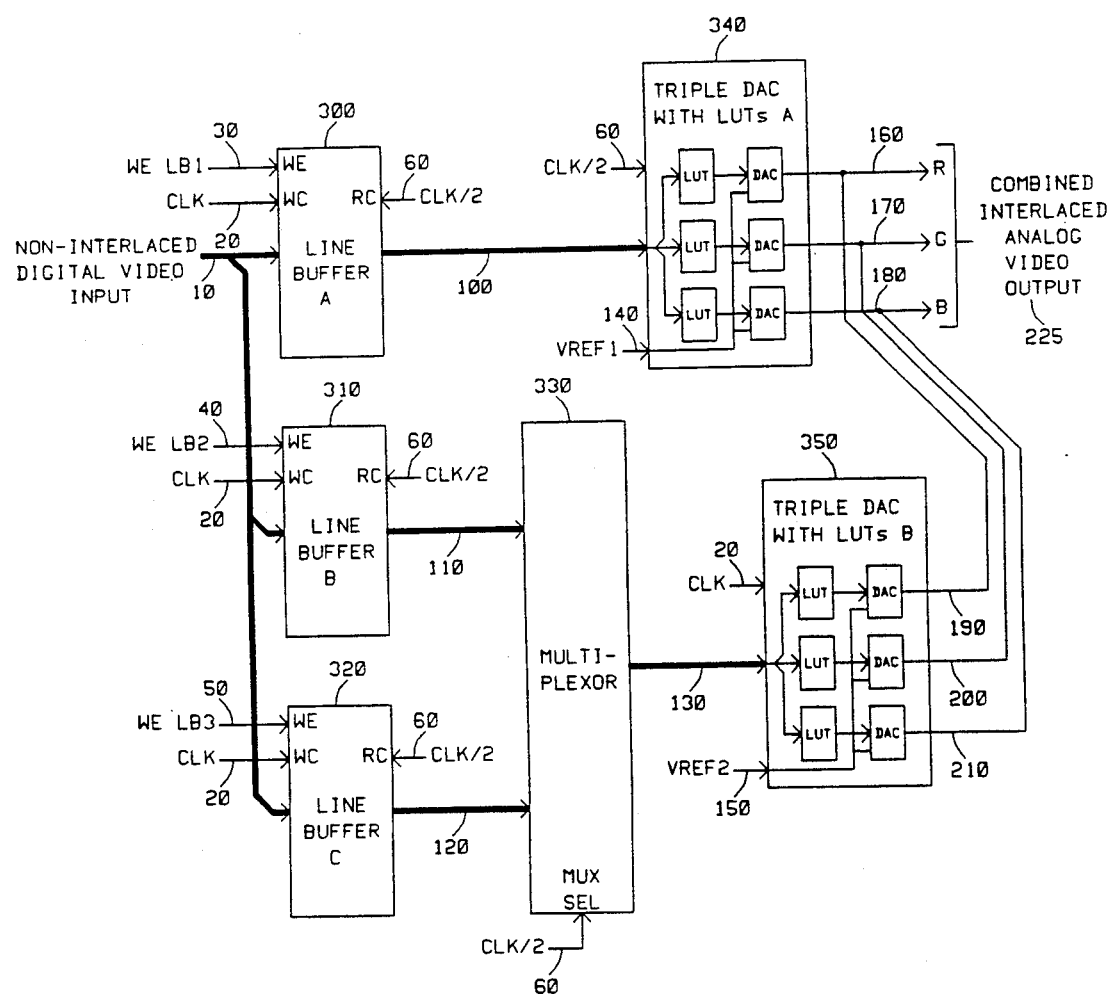
FIG. 1 is a block diagram of a flicker reducing circuit in accordance with the present invention.

A flicker reducing circuit according to the present invention is shown in FIG. 1, with reference to FIGS. 5A-5H and FIGS. 6A-6C. This invention is applied to, by way of example, conversion of a non-interlaced digital video source, such as that supplied by a computer graphics frame buffer, to an interlaced analog video signal in RGB format, suitable for conversion to NTSC format in order to drive a standard NTSC output device such as a television receiver.

Figure 2:
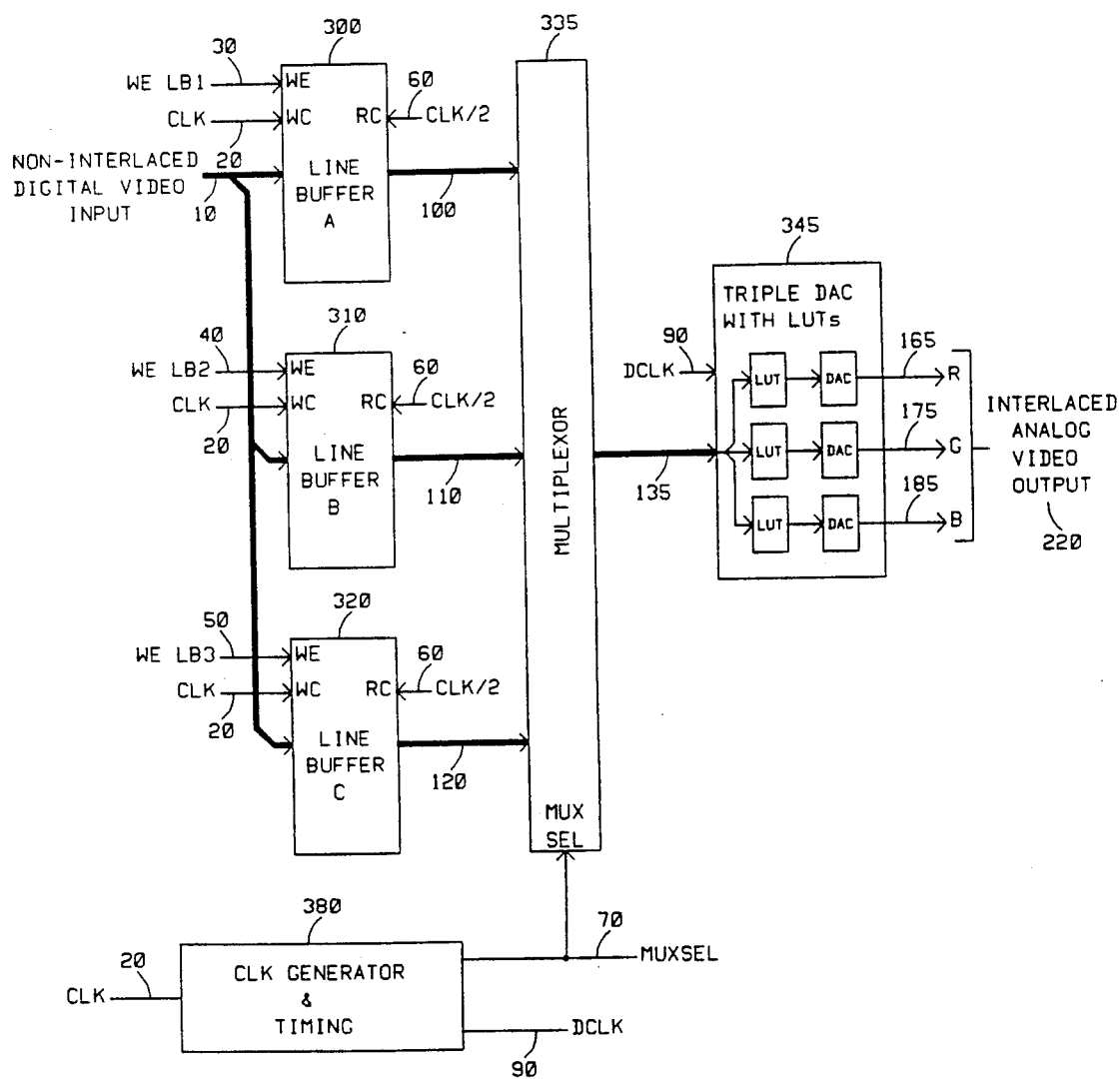
FIG. 2 is a block diagram of a flicker reducing circuit in accordance with an alternative embodiment of the present invention.
Figure 3:
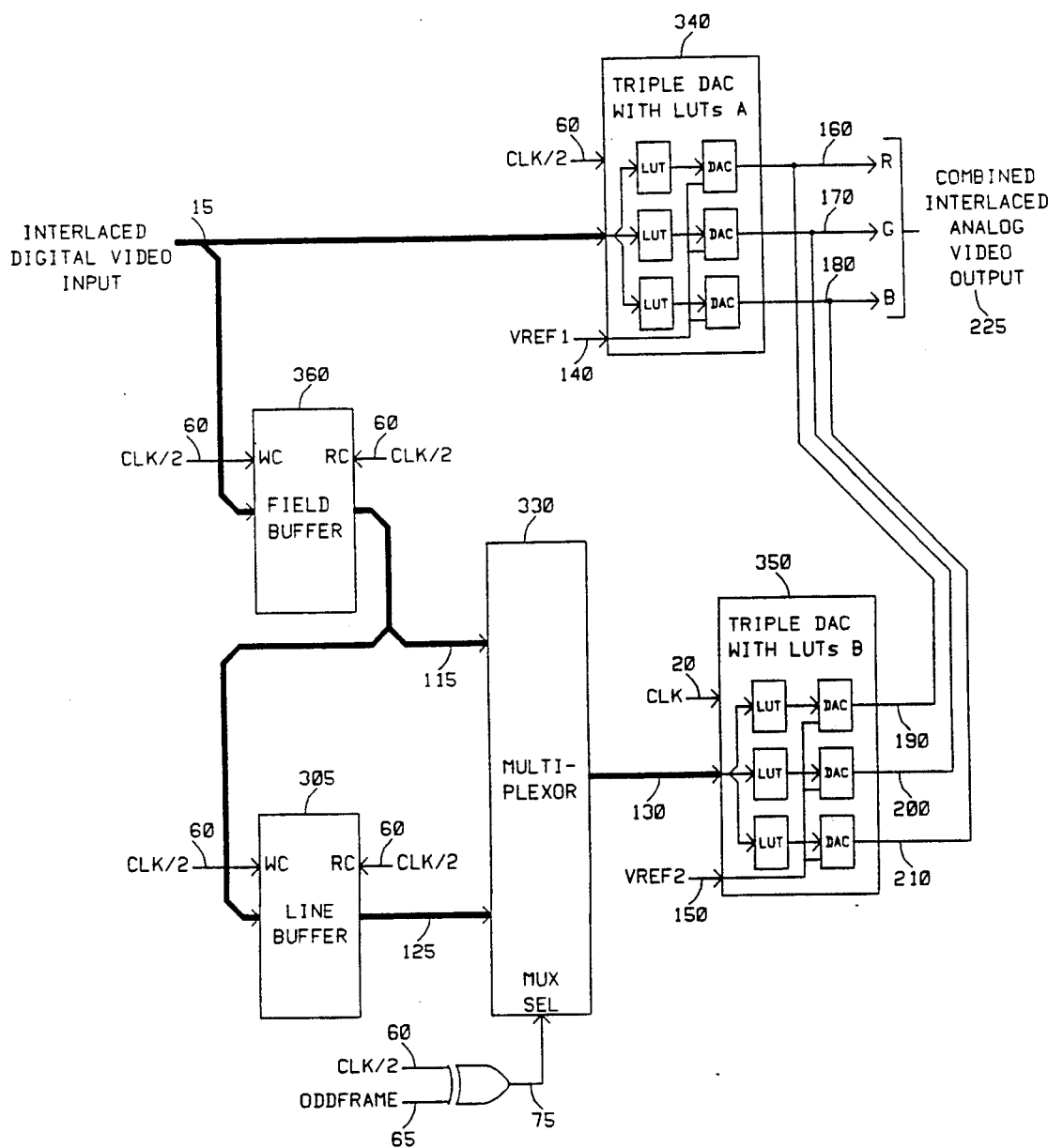
FIG. 3 is a block diagram of a flicker reducing circuit in accordance with another embodiment of the present invention.
Figure 4:
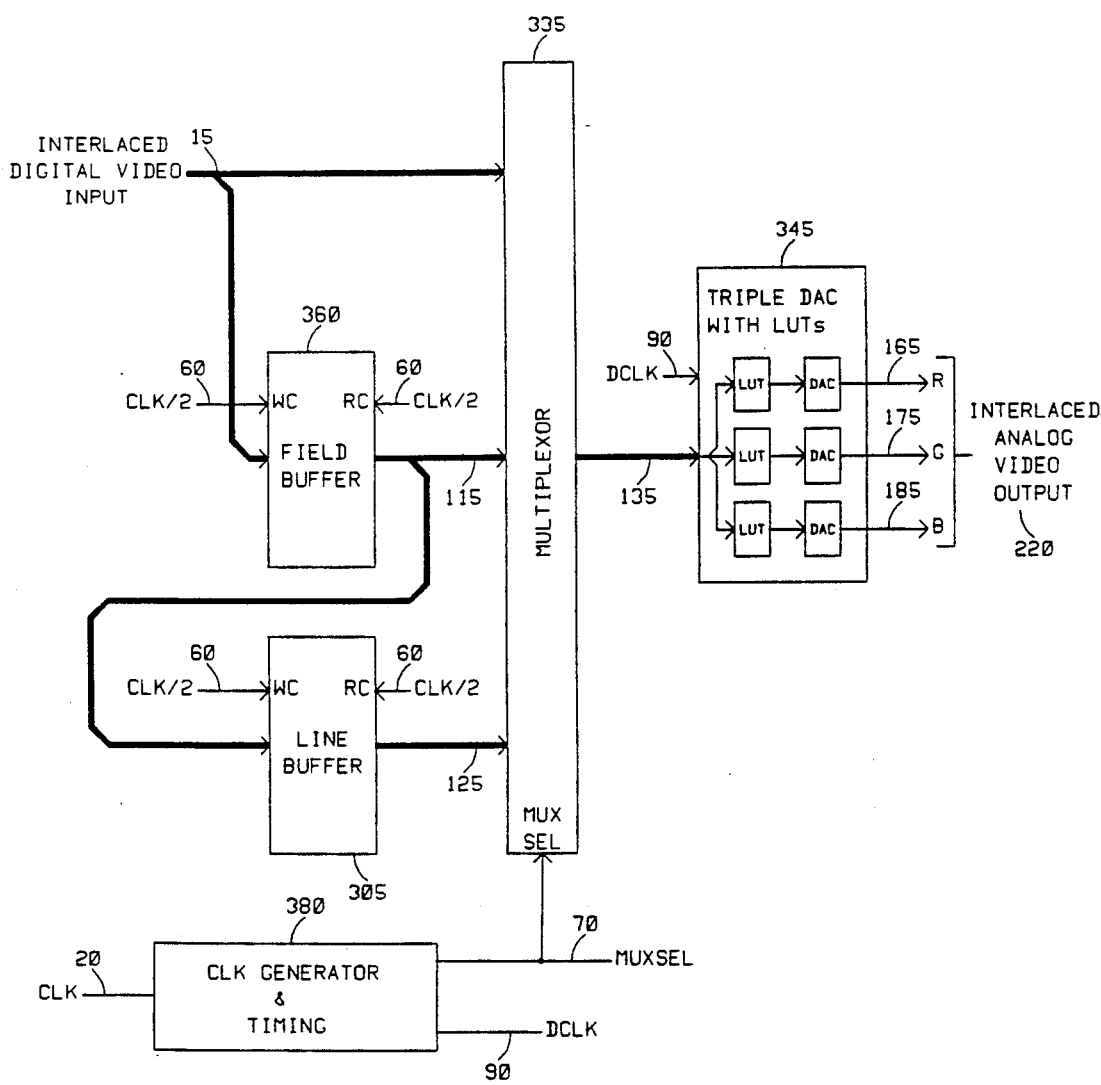
FIG. 4 is a block diagram of a flicker reducing circuit in accordance with yet another embodiment of the present invention.

Other embodiments of the present invention are diagrammed in FIGS. 2, 3 and 4. The example diagrammed in FIG. 2 will reference FIGS. 5A-5H, FIGS. 7A and 7B and FIGS. 8A and 8B. The example diagrammed in FIG. 3 will reference FIGS. 9A-9C and FIGS. 6A-6C. The example diagrammed in FIG. 4 will reference FIGS. 9A-9C, FIGS. 7A and 7B and FIGS. 8A and 8B.

FIGS. 5A-5H diagram field timing of the video signals shown in FIGS. 1 and 2, where L1 ... L525 represent line 1 through line 525 of video signal, and which in aggregate make up a full frame of video. The horizontal axes of FIGS. 5A-5H are in time units.

FIGS. 6A-6C diagram the time division multiplexed pixel output timing of the video signals output by the Triple DACs with LUTs A 340 and B 350 shown in FIG. 1 and 3, where PIXEL N−1, PIXEL N and PIXEL N+1 represent horizontally adjacent pixels in a given line of video, and where LINE M−1, LINE M and LINE M+1 represent vertically adjacent lines of video in a given image frame.

FIGS. 7A and 7B diagram the time division multiplexed pixel output timing of the Triple DAC with LUTs 345 in FIGS. 2 and 4. FIG. 7A represents the pixel timing when flicker reduction is enabled. FIG. 7B represents the pixel timing when no flicker reduction is performed.

Figure 8:
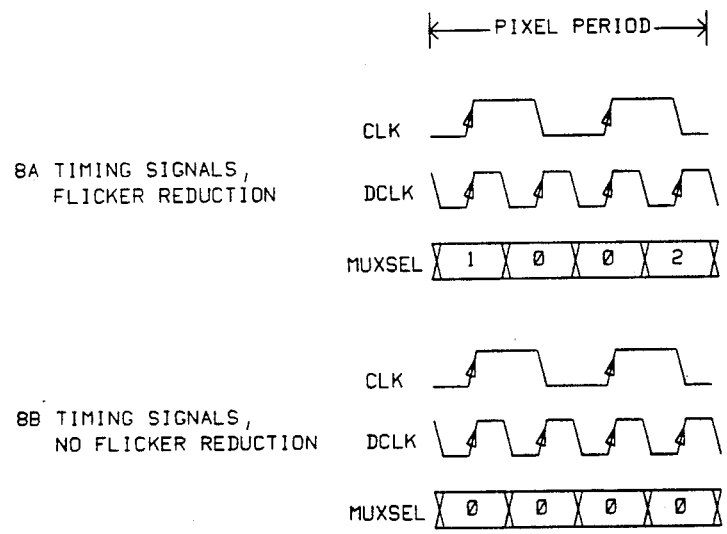
FIG. 8 (A through B) is a waveform diagram used to explain the operation of the flicker reducing circuits shown in FIGS. 2 and 4.

FIGS. 8A and 8B diagram the MUXSEL 70 and DCLK 90 signal waveforms used to generate the pixel output timings diagrammed in FIGS. 7A and 7B, respectively.

Figure 9:
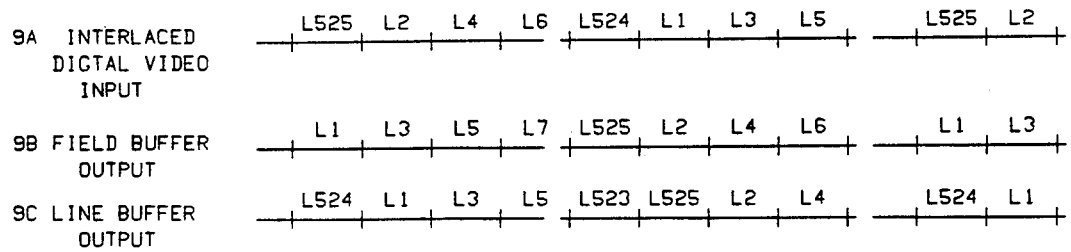
FIG. 9 (A through C) is a timing diagram used to explain the operation of the flicker reducing circuits shown in FIGS. 3 and 4.

FIGS. 9A-9C diagram field timing of the video signals shown in FIGS. 3 and 4, where L1 ... L525 represent line 1 through line 525 of video signal, and which in aggregate make up a full frame of video. The horizontal axes of FIGS. 9A-9C are in time units.

First Embodiment—FIG. 1

Figure 5:
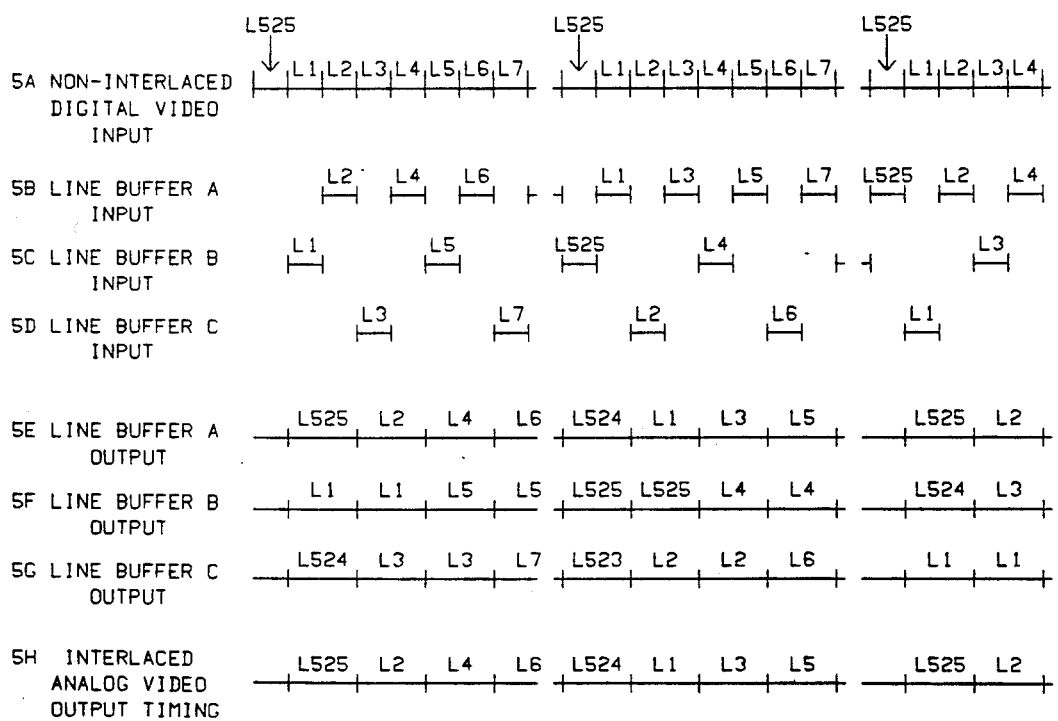
FIG. 5 (A through H) is a timing diagram used to explain the operation of the flicker reducing circuits shown in FIGS. 1 and 2.

In the embodiment of the invention shown in FIG. 1, a signal source 10 of non-interlaced digital video is directed to Line Buffers A 300, B 310 and C 320. The timing for this non-interlaced digital video input signal is as shown in FIG. 5A. The video input signal 10 is clocked into said Line Buffers A 300, B 310 and C 320 at the pixel clock rate represented by signal CLK 20. Write enable signal WE LB1 30 enables loading of the video input signal 10 into the Line Buffer A 300. The timing of the video input signal 10 as loaded into the Line Buffer A 300 is represented in FIG. 5B. Note that the Line Buffer A 300 is loaded with every other line of input video, alternating between all even lines in a frame and all odd lines in a frame.

Write enable signal WE LB2 40 enables loading of the video input signal 10 into the Line Buffer B 310. The timing of the video input signal 10 as loaded into the Line Buffer B 310 is represented in FIG. 5C. Note that the Line Buffer B 310 is loaded with every fourth line of input video, alternating between even lines in a frame and odd lines in a frame.

Write enable signal WE LB3 50 enables loading of the video input signal 10 into the Line Buffer C 320. The timing of the video input signal 10 as loaded into the Line Buffer C 320 is represented in FIG. 5D. Note that the Line Buffer C 320 is loaded with every fourth line of input video, alternating between odd lines in a frame and even lines in a frame.

The above described write enable timing signals effect the result that in the field time during which the Line Buffer A 300 is loaded with even lines, odd lines are alternated into the Line Buffers B 310 and C 320. Similarly, in the field time during which Line Buffer A 300 is loaded with odd lines, even lines are alternated into the Line Buffers B 310 and C 320.

Buffered video signal outputs of said Line Buffers A 300, B 310 and C 320, which outputs are represented by reference numerals 100, 110 and 120, respectively, are each clocked at the pixel clock rate represented by signal CLK/2 60, which is one half the clock rate of the signal CLK 20. This clocking enables output of the buffered video signals 100, 110 and 120 as represented by FIGS. 5E, 5F and 5G, respectively. The Line Buffer A 300 presents the buffered video signal 100, as represented by FIG. 5E. Note that the Line Buffer A 300 presents every other line of input video at one half clock rate, i.e. at the interlaced output video horizontal sweep rate, delayed by one input line period, and alternating between all even input lines in a frame and all odd input lines in a frame.

The Line Buffer B 310 presents buffered video signal 110, as represented by FIG. 5F. Note that the Line Buffer B 310 presents every fourth line of input video at one half clock rate repeated for a total output time of two output video horizontal sweep periods with the starting line presented progressing by three lines each field.

The Line Buffer C 320 presents buffered video signal 120, as represented by FIG. 5G. Note that the Line Buffer C 320 presents every fourth line of input video at one half clock rate repeated for a total output time of two output video horizontal output sweep periods, with the starting line presented progressing by three lines each field.

The above described line timing effects the result that for each line of the buffered signal 100 presented by the Line Buffer A 300 during an output video horizontal sweep period, the Line Buffers B 310 and C 320 present the adjacent lines of buffered signal. The Line Buffers B 310 and C 320 alternate frame by frame in presenting prior lines of buffered signal and following lines of buffered signal.

The output of the Line Buffer 300, signal 100, is presented to Triple DAC with LUTs A 340. This integrated component clocks in the signal 100 at the pixel clock rate CLK/2 60. The RGB components of the input signal are then internally translated using three look-up tables (LUTs) and presented to three digital to analog signal converters (DACs). The Triple DAC with LUTs A 340 outputs red, green and blue analog signals R 160, G 170 and B 180, respectively. Signal VREF1 140 represents a bias voltage controlling the intensity of the analog output signals 160, 170 and 180. The VREF1 140 can vary between logic levels 0 . . . 1, producing the analog output signals 160, 170 and 180 in zero to full intensity. The pixel timing of the output signals 160, 170 and 180 is as shown in FIG. 6A.

The output signals of the Line Buffers B 310 and C 320, signals 110 and 120, respectively, are presented to Multiplexor 330. The Multiplexor 330 input signal selection is controlled by the signal CLK/2 60, which alternates selection between the signals 110 and 120 pixel by pixel. The Multiplexor 330 outputs multiplexed signal 130 which is composed of alternate pixels from the Line Buffers B 310 and C 320, clocked at twice the output video horizontal sweep rate. Note, that the frame by frame alternation of prior and following lines of buffered signal presented by the Line Buffers B 310 and C 320 causes frame by frame alternation of the source, prior or following line, of the starting pixel selected by the Multiplexor 330 for each line of the multiplexed output signal 130.

The Multiplexor 330 output signal 130 is presented to Triple DAC with LUTs B 350. This integrated component clocks in the signal 130 at the pixel clock rate CLK 20, twice the rate the signal 100 is clocked into the Triple DAC With LUTs A 340. As described above for the Triple DAC with LUTs A 340, the Triple DAC with LUTs B 350 outputs red, green and blue analog signals R 190, G 200 and B 210, respectively. Signal VREF2 150 represents a bias voltage controlling the intensity of the analog output signals 190, 200 and 210. The VREF2 150 can vary between logic levels 0 . . . 1, producing the analog output signals 190, 200 and 210 from zero to full intensity. Example pixel timing of the output signals 190, 200 and 210 is shown in FIGS. 6B and 6C, where FIGS. 6B and 6C represent sequential frames of output video.

The output signals R 190, G 200 and B 210 are therefore time division multiplexed analog signals derived from the two lines of digital video input adjacent to the line of digital video input which was the source for the analog output signals R 160, G 170 and B 180. Note that the frame by frame alternation of the source, prior or following line, of the first pixel presented by the Multiplexor 330 for each line of the output signal 130 causes frame by frame alternation of the source of the pixel in each time division, as shown in FIGS. 6B and 6C. This feature prevents a perceivable horizontal displacement that would otherwise occur in the output video signal.

Finally, the signal 160 is wire-OR'ed with the signal 190, the signal 170 with the signal 200, and the signal 180 with the signal 210, having the effect of summing the currents for each signal pair, to produce output signal combined Interlaced Analog Video Output 225 in RGB format. Line timing of the signal 220 is as diagrammed in FIG. 5H.

As shown above, the ratio of the signal VREF1 140 to the signal VREF2 150 controls the contribution of adjacent video lines to the current line of video output. For example, when the VREF1 140 is 0.5 and the VREF2 150 is 0.5, one quarter is contributed by the prior line, one half by the current line, and one quarter by the following line. This results in significant reduction of apparent flicker, at some loss of vertical resolution. When the VREF1 140 is 1.0 and the VREF2 150 is 0.0, the circuit described becomes a non-interlaced to interlaced video converter with no flicker reduction and no loss of resolution. Note that the time division multiplexed pixel timing of the RGB output signals 160, 170, 180, 190, 200 and 210 remains as shown in FIGS. 6A–6C, while the relative intensity of the RGB output signals 160, 170 and 180 shown in FIG. 6A and that of the RGB output signals 190, 200 and 210 shown in FIG. 6B and 6C vary as the signals VREF1 140 and VREF2 150 vary.

Second Embodiment—FIG. 2

An alternative embodiment of the invention is shown in FIG. 2, where the same reference numerals as those of FIG. 1 represent the same components and signals, and their detailed explanation will be omitted for the sake of brevity. Here the invention is similarly applied to conversion of a non-interlaced digital video source to an interlaced analog video output signal. In this example, however, the output signals of the Line Buffers A 300, B 310 and C 320, Signals 100, 110 and 120, respectively, are time division multiplexed by a Multiplexor 335 to a single Triple DAC with LUTs 345. A Clock Generator and Timing Circuit 380 controls the contribution of adjacent video lines to the current line of video output. Here, the Triple DAC with LUTs 345 is run at twice the rate of the Triple DAC with LUTs B 350 shown in FIG. 1 to achieve the same level of flicker reduction.

The output signals of the Line Buffers A 300, B 310 and C 320, the signals 100, 110 and 120 respectively, which are as described for FIG. 1 above, are presented to the Multiplexor 335. In this embodiment, however, a signal MUXSEL, 70 from the Clock Generator and Timing Circuit 380 selects the signal, 100, 110 or 120, to be output from the Multiplexor 335 at any given time. The Multiplexor 335 outputs a time division multiplexed signal 135. The Clock Generator and Timing Circuit 380 also provides a signal DCLK 90, which is a clock signal of a frequency equal to or exceeding the maximum frequency of the signal MUXSEL 70.

The multiplexed output signal 135 is presented to the Triple DAC with LUTs 345. This integrated component clocks in the time division multiplexed video signal 135 at the clock rate DCLK 90. As described above for the Triple DACs with LUTs A 340 and B 350 in FIG. 1, the Triple DAC with LUTs 345 outputs red, green and blue analog video signals R 165, G 175 and B 185, respectively. Taken together, the signals R 165, G 175 and B 185 represent RGB format output signal Interlaced Analog Video Output 220. Line timing of the signal 220 is as diagrammed in FIG. 5H.

The signal MUXSEL 70 controls the contribution of adjacent Video lines to the current line of video output in order to effect flicker reduction. Although many implementations of the Clock Generator and Timing Circuit 380 can be envisioned, one possible implementation is to pre-program a programmable array logic component (PAL) with several selectable MUXSEL and DCLK signal patterns. To achieve, for example, the flicker reduction effected by pixel timing as diagrammed in FIG. 7A, the signals MUXSEL 70 and DCLK 90 would be as diagrammed in FIG. 8A. To achieve the flicker reduction effected by pixel timing as diagrammed in FIG. 7B, the signals MUXSEL 70 and DCLK 90 would be as diagrammed in FIG. 8B.

Third Embodiment—FIG. 3

Another embodiment of the invention is shown in FIG. 3, where the same reference numerals as those of FIG. 1 represent the same components and signals, and their detailed explanation will be omitted for the sake of brevity. Here the invention is applied to a circuit with an interlaced, rather than non-interlaced, digital video source, so the Line Buffers A 300, B 310 and C 320 of FIG. 1 are replaced in FIG. 3 by a Field Buffer 360 and a Line Buffer 305. The signal 130 presented to the Triple DAC with LUTs B 350, the RGB; output signals 160, 170, 180, 190, 200 and 210, and the resulting Combined Interlaced Analog Video Output signal 225 are as described for FIG. 1 above, and their detailed explanations will therefore be omitted in the following description.

In FIG. 3, input signal 15 is a signal source of Interlaced Digital Video Input. The timing for the input signal 15 is as shown in FIG. 9A. Note that the signal 15 operates at a rate of CLK/2, that is, the signal 15 operates at the interlaced output video horizontal sweep rate, and is identical to the Line Buffer A 300 output signal 100 of FIG. 1 described above. The video input signal 15 is presented to the Triple DAC with Luts A 340, and also to the Field Buffer 360.

The video input signal 15 is clocked into the Field Buffer 360 at the pixel clock rate represented by the signal CLK/2 60. The Field Buffer 360, therefore, is first loaded with all odd lines in a frame, then with all even lines in a frame.

The output of the Field Buffer 360, a buffered video signal 115, is clocked at the pixel clock rate represented by the signal CLK/2 60. This clocking enables output of said buffered video signal 115 as diagrammed in FIG. 9B.

The buffered video signal 115 is presented both to the Multiplexor 330 and to the Line Buffer 305. The Line Buffer 305 outputs a signal 125 which is also clocked at the pixel Clock rate represented by the signal CLK/2 60. The horizontal line timing of the output signal 125 is diagrammed in FIG. 9C. The Line Buffer 305, therefore, has the effect of delaying its input by one period.

Note that the Field Buffer 360 presents every line of interlaced video input, delayed by one field, at the interlaced output video horizontal sweep rate. The Line Buffer 305 also presents every line of interlaced video input, delayed by one field plus one input line period.

The above described line timing effects the result that for each line of the interlaced video input signal 15 presented during an output video horizontal sweep period, the Field Buffer 360 and the Line Buffer 305 present the adjacent lines of Video signal from the prior field of interlaced video input.

The output signals of the Field Buffer 360 and the Line Buffer 305, the signals 115 and 120 respectively, are presented to the Multiplexor 330. The Multiplexor 330 input signal selection is controlled by a signal 75, which signal is composed of the signal CLK/2 60 exclusive-OR'ed with a signal ODDFRAME 65. Selection alternates, therefore, between the signals 115 and 125 pixel by pixel and alternates frame by frame whether, for each line, a pixel from the signal 115 or from the signal 125 is presented first. The Multiplexor 330 outputs a multiplexed signal 130 which is composed of alternate pixels from the Field Buffer 360 and from the Line Buffer 305, clocked at twice the output video horizontal sweep rate.

The remainder of the circuit diagrammed in FIG. 3 operates as described for the circuit diagrammed in FIG. 1, above. Flicker reduction is achieved by time division multiplexing of the video output signal as described therein. Horizontal displacement of the output signal is prevented by the frame by frame alternation of the starting pixel presented by the Multiplexor 330 as described above.

Fourth Embodiment—FIG. 4

Yet another embodiment of the invention is shown in FIG. 4, where this invention is directed to a circuit which operates on an interlaced video source. The input portion of the circuit is as described for FIG. 3, above. The remainder of the circuit diagrammed in FIG. 4 operates as described for the circuit diagrammed in FIG. 2, above. In FIG. 4, the same reference numerals as those of FIGS. 2 and 3 represent the same signals, and their detailed explanation and the detailed explanation of the circuit is omitted for the sake of brevity. Flicker reduction is achieved by time division multiplexing of the video output signal as described for the circuit diagrammed in FIG. 2.

Ramifications and Scope

Although the above description has been given of particular preferred embodiments of the invention, with reference to the accompanying drawings, these should not be construed as limiting the scope of the invention, but as merely providing what I presently regard as the best modes for practicing this invention. It will be apparent that many modifications and variations on this invention could be effected by one skilled in the art without departing from the spirit and scope of the novel concepts of the invention.

Thus, the scope of the invention should be determined by the appended claims and their legal equivalents, rather than by the examples given.

I claim:

1. A circuit which combines a plurality of adjacent lines of video signal input, where each line consists of a plurality of pixels, to produce an interlaced analog video signal output, said circuit comprising:

processing means for receiving digital video signal input and providing therefrom a time division multiplexed video signal, the time division multiplexed video signal comprising a plurality of time division units, where each of the time division units contains a portion of the digital video signal input corresponding to a single pixel within a single line of the digital video signal input, and where for each pixel position within a line of the video signal input, the corresponding pixels from said plurality of adjacent lines of video signal input are contained in adjacent units of the time divisions; and digital to analog signal conversion means for receiving said time division multiplexed signal at a sampling rate sufficient for sampling of the time division units and delivering the corresponding time division multiplexed analog video signal output suitable for driving an interlaced video output device.

2. A circuit as in claim 1, wherein said plurality of adjacent lines of video signal input comprises a prior portion and a following portion, and wherein said processing means further comprises means whereby the arrangement of the time division units within said time division multiplexed signal is such that the time division units occupied by pixels from the prior adjacent lines of video signal input and the time division units occupied by pixels from the following adjacent lines of video signal input alternate for successive frames of the video signal input.

3. A circuit as in claim 1, wherein said plurality of adjacent lines of video signal input is restricted to three adjacent lines of video signal input, and where the three lines of video signal input are a prior line of video signal input, a center line of video signal input and a following line of video signal input.

4. A circuit as in claim 3, wherein said processing means further comprises means whereby the arrangement of the time division units within said time division multiplexed signal is such that the plurality of time division units occupied by pixels from said prior line of video signal input and the plurality of time division units occupied by pixels from said following line of video signal input alternate for successive frames of the video signal input.

5. A circuit as in claim 3, further comprising:

buffering means for receiving a non-interlaced video signal input and presenting therefrom said center line of video signal input, said prior line of video signal input and said following line of video signal input, where said buffering means presents the lines of video signal input at a rate equivalent to the rate of the interlaced video signal output, and including means by which said center line of video signal input is delayed by one horizontal line period, said prior line of video signal input is delayed by two horizontal line periods and said following line of video signal input is undelayed, relative to said non-interlaced video signal input.

6. A circuit as in claim 5, wherein said buffering means further comprises means whereby the presentation order of said prior line of video signal input and said following line of video signal input alternates for successive frames of said non-interlaced video signal input to cause said processing means to alternate, for successive frames of said non-interlaced video signal input, the plurality of time division units occupied by pixels from said prior line of video signal input with the plurality of time division units occupied by pixels from said following line of video signal input.

7. A circuit as in claim 3, further comprising:

buffering means for receiving an interlaced video signal input and presenting therefrom said prior line of video signal input and said following line of video signal input, where said buffering means presents the lines of video signal input at a rate equivalent to the rate of the interlaced video signal output, and including means by which said prior line of video signal input is delayed by one field period less one horizontal line period and said following line of video signal input is delayed by one field period, relative to said interlaced video signal input.

8. A circuit as in claim 7, wherein said buffering means further comprises means whereby the presentation order of said prior line of video signal input and said following line of video signal input alternates for successive frames of said interlaced video signal input to cause said processing means to alternate, for successive frames of said interlaced video signal input, the plurality of time division units occupied by pixels from said prior line of video signal input with the plurality of time division units occupied by pixels from said following line of video signal input.

9. A circuit which combines, for each horizontal line of video signal input, a plurality of prior adjacent lines of video signal input with a plurality of following adjacent lines of video signal input, where each line consists of a plurality of pixels, to produce a time division multiplexed analog video signal, and which converts said horizontal line of video signal input to an analog video signal, and which combines said time division multiplexed analog video signal with said analog video signal to produce an interlaced analog video signal output, said circuit comprising:

processing means for receiving said plurality of prior adjacent lines of video signal input and said plurality of following adjacent lines of video signal input and providing therefrom a time division multiplexed signal comprising a plurality of time division units, where each of the time division units contains a portion of the video signal input corresponding to a single pixel within a single line selected from the group consisting of the prior and the following lines of video signal input, and where for each pixel position within said horizontal line of video signal input, corresponding pixels from said plurality of prior adjacent lines of video signal input and from said plurality of following adjacent lines of video signal input are contained in adjacent units of the time divisions;

first digital to analog signal conversion means for receiving said time division multiplexed signal at a sampling rate sufficient for sampling of the time division units and delivering said time division multiplexed analog video signal, and including means for biasing the amplitude of said time division multiplexed analog video signal;

second digital to analog signal conversion means for receiving said horizontal line of video signal input at a sampling rate sufficient for sampling of said horizontal line of video signal input and delivering said analog video signal, and including means for biasing the amplitude of said analog video signal; and combining means for combining said time division multiplexed analog video signal with said analog video signal and delivering the corresponding sum analog video signal output suitable for driving an interlaced video output device.

10. A circuit as in claim 9, wherein said processing means further comprises means whereby the arrangement of the time division units within said time division multiplexed signal is such that the time division units occupied by pixels from said plurality of prior adjacent lines of video signal input and the time division units occupied by pixels from said plurality of following lines of video signal input alternate for successive frames of video signal input.

11. A circuit as in claim 9, wherein said plurality of prior lines of adjacent video signal input is restricted to a prior line of video signal input and wherein said plurality of following lines of video signal input is restricted to a following line of video signal input.

12. A circuit as in claim 11, wherein said processing means further comprises means whereby the arrangement of the time division units within said time division multiplexed signal is such that the plurality of time division units occupied by pixels from said prior line of video signal input and the plurality of time division units occupied by pixels from said following line of video signal input alternate for successive frames of the video signal input.

13. A circuit as in claim 11, further comprising:

buffering means for receiving a non-interlaced video signal input and presenting therefrom said horizontal line of video signal input, said prior line of video signal input and said following line of video signal input, where said buffering means presents the lines of video signal input at a rate equivalent to the rate of the interlaced video signal output, including means by which said horizontal line of video signal input is delayed by one horizontal line period, said prior line of video signal input is delayed by two horizontal line periods and said following line of video signal input is undelayed, relative to said non-interlaced video signal input.

14. A circuit as in claim 13, wherein said buffering means further comprises means whereby the presentation order of said prior line of video signal input and said following line of video signal input alternates for successive frames of said non-interlaced video signal input to cause said processing means to alternate, for successive frames of said non-interlaced video signal input, the plurality of time division units occupied by pixels from said prior line of video signal input with the plurality of time division units occupied by pixels from said following line of video signal input.

15. A circuit as in claim 11, further comprising:

buffering means for receiving an interlaced video signal input and presenting therefrom said prior line of video signal input and said following line of video signal input, where said buffering means presents the lines of video signal input at a rate equivalent to the rate of the interlaced video signal output, and including means by which said prior line of video signal input is delayed by one field period less one horizontal line period and said following line of video signal input is delayed by one field period, relative to said interlaced video signal input.

16. A circuit as in claim 15, wherein said buffering means further comprises means whereby the presentation order of said prior line of video signal input and said following line of video signal input alternates for successive frames of said interlaced video signal input to cause said processing means to alternate, for successive frames of said interlaced video signal input, the plurality of time division units occupied by pixels from said prior line of video signal input with the plurality of time division units occupied by pixels from said following line of video signal input.

17. A flicker filter, comprising:

a plurality of buffers for receiving digital video input signals, said video input signals formatted to correspond to a plurality of scan lines, each scan line including pixel data, said buffers each responsive to control signals for:
storing said pixel data for a selected scan line provided at an input, and
providing said pixel data at an output;

a first digital-to-analog converter circuit, coupled to said output of one of said plurality of buffers and responsive to one of said control signals, for converting said pixel data of one particular scan line of said digital video input signals into analog signals, said first digital-to-analog converter circuit providing said converted pixel data at an output;

a multiplexer, responsive to said one of said control signals and coupled to said output of a second one and a third one of said plurality of buffers, for routing a particular one of said pixel data of a selected one scan line of said second and third buffer to an output of said multiplexer; and a second digital-to-analog converter circuit, coupled to said output of said multiplexer and responsive to one of said control signals, for converting said particular one pixel data into analog signals, said second digital-to-analog converter circuit providing said converted digital video signals of said particular one pixel data an output of said second converter circuit coupled to said output of said first digital-to-analog converter circuit.

18. The flicker filter of claim 17 wherein said digital video input includes non-interlaced scan lines and said second and third line buffers store scan lines that occur immediately prior to and immediately subsequent to said first particular video input line.

19. The flicker filter of claim 17 wherein said first and second digital-to-analog converter circuits comprise a plurality of digital-to-analog converters, each respectively converting pixel data for particular ones of a set of orthogonal colors.

20. The flicker filter of claim 17 further comprising timing means, coupled to said multiplexer, for alternately selecting, for each pixel datum of said particular scan line, a desired corresponding one pixel datum from said second and third line buffers during a period in which said first converter circuit converts a particular corresponding one pixel datum of said particular one scan line.

21. A flicker filter, comprising:
a plurality of buffers for receiving digital video input signals, said video input signals formatted to correspond to a plurality of scan lines, each scan line including pixel data used for image development, said buffers each responsive to control signals for:
storing pixel data of a selected scan line provided at an input, and;
for providing said pixel data at an output, a first one of said buffers storing a field of pixel data and a second one of said buffers, having an input coupled to an output of said first one buffer, storing a line of said pixel data;
a first digital-to-analog converter circuit, responsive to one of said control signals, for converting said pixel data of a first particular scan line of said digital video input signals into analog signals, said first digital-to-analog converter circuit providing said converted digital video signals at an output;
a multiplexer, responsive to said one of said control signals and coupled to said output of said first one and an output of said second one of said plurality of buffers, for routing a particular one of said pixel data of a selected one scan line of said second and third line buffer to an output of said multiplexer; and
a second digital-to-analog converter circuit, coupled to said output of said multiplexer and responsive to one of said control signals, for converting said particular one pixel data into analog signals, said second digital-to-analog converter circuit providing said converted digital video signals to said particular one pixel data an output of said second converter circuit coupled to said output of said first digital-to-analog converter circuit.

22. The flicker filter of claim 21 wherein said digital video input includes interlaced digital signals and said first and second buffers store scan lines that occur immediately prior to and immediately subsequent to said first particular video input line.

23. The flicker filter of claim 21 wherein said first and second digital-to-analog converter circuits comprise a plurality of digital-to-analog converters, each respectively converting pixel information for particular ones of a set of orthogonal colors.

24. A flicker filter, comprising:
a plurality of buffers for receiving digital video input signals, said video input signals formatted to correspond to a plurality of scan lines, each scan line including pixel data, said buffers each responsive to control signals for:
storing said pixel data for a selected scan line provided at an input, and
providing said pixel data at an output;
a timing circuit, responsive to one of said control signals, for generation of a select signal and a clock signal;

a multiplexer, coupled to said outputs of said buffers and responsive to said select signal, to successively route particular corresponding pixel data from said plurality of buffers to an output of said multiplexer in order to provide digital pixel information from at least two of said buffers during one output pixel period; and
a digital-to-analog converter circuit, coupled to said multiplexer output and responsive to said clock signal, for converting said particular corresponding pixel data into analog signals.

25. The flicker filter of claim 24 wherein said digital input includes non-interlaced digital signals, one buffer stores scan lines that occur prior to a particular one scan line stored in a first one of said plurality of buffers and another buffer stores can lines subsequent to said particular one scan line.

26. The flicker filter of claim 24 wherein said digital-to-analog converter circuit comprises a plurality of digital-to-analog converters, each respectively converting corresponding time-multiplexed pixel data for particular ones of a set of orthogonal colors.

27. The flicker filter of claim 24 wherein said clock signal and said select signal are periodic and each have a cycle time greater than a pixel period to time-division multiplex each of a plurality of pixel times of each pixel of each output scan line with analog information converted from corresponding digital pixel data from at least two of said input scan lines.

28. A flicker filter, comprising:
a plurality of buffers for receiving digital video input signals, said video input signals formatted to correspond to a plurality of scan lines, each scan line including pixel data used for image development, said buffers each responsive to control signals for:
storing pixel data of a selected scan line provided at an input, and;
for providing said pixel data at an output, a first one of said buffers storing a field of pixel data and a second one of said buffers, having an input coupled to an output of said first one buffer, storing a line of said pixel data;
a timing circuit, responsive to one of said control signals, for generation of a select signal and a clock signal;
a multiplexer, coupled to said output of said buffers and responsive to said select signal, to successively route particular corresponding pixel data from said plurality of buffers and an input receiving said digital video input to an output of said multiplexer in order to provide digital pixel information from at least one of said buffers and said input receiving said digital video input during one output pixel period; and
a digital-to-analog converter circuit, coupled to said multiplexer output and responsive to said clock signal, for converting said particular corresponding pixel data into analog signals.

29. The flicker filter of claim 28 wherein said digital input includes non-interlaced digital signals, one buffer stores scan lines that occur prior to a particular one scan line stored in a first one of said plurality of buffers and another buffer stores scan lines subsequent to said particular one scan line.

30. The flicker filter of claim 28 wherein said first and second digital-to-analog converter circuit comprise a plurality of digital-to-analog converters, each respectively converting pixel information for particular ones of a set of orthogonal colors.

31. The flicker filter of claim 28 wherein said clock signal and said select signal are periodic and each have a cycle time greater than a pixel period to time-division multiplex each of a plurality of pixel times of each pixel of each output scan line with analog information converted from corresponding digital pixel information from at least two of said input scan lines.

32. A method for producing output video signals from a plurality of digital video input signals formatted to produce a plurality of scan lines for an image development device, each scan line including a plurality of pixel data, comprising the steps of:
converting a particular one of the plurality of scan lines to an analog output signal;
time-division multiplexing corresponding pixel data from at least one more scan line to produce a time division multiplexed digital output, said one more scan line being adjacent to said particular one scan line;
converting said time division multiplexed digital output to a time division multiplexed analog output signal; and
merging said analog output signal with said time division multiplexed analog output signal.

33. A method for producing output video signals from a plurality of digital video input signals formatted to produce a plurality of scan lines for an image development device, each scan line including a plurality of pixel data, comprising the steps of:
time-division multiplexing corresponding pixel data from a plurality of adjacent scan lines within the digital video input to produce a time division multiplexed digital output; and
converting said time division multiplexed digital output to a time division multiplexed analog output signal.

* * * * *